(12) United States Patent
Her et al.

(10) Patent No.: US 11,413,794 B2
(45) Date of Patent: Aug. 16, 2022

(54) METHOD FOR PREPARING POLYMER PARTICLES

(71) Applicant: LG CHEM, LTD., Seoul (KR)

(72) Inventors: Eun Kyu Her, Daejeon (KR); Chang Sun Han, Daejeon (KR); Bu Gon Shin, Daejeon (KR); Jeong Ho Park, Daejeon (KR); Soo Jin Lee, Daejeon (KR); Taebin Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 635 days.

(21) Appl. No.: 16/330,693

(22) PCT Filed: Dec. 5, 2017

(86) PCT No.: PCT/KR2017/014151
§ 371 (c)(1),
(2) Date: Mar. 5, 2019

(87) PCT Pub. No.: WO2018/128279
PCT Pub. Date: Jul. 12, 2018

(65) Prior Publication Data
US 2021/0284808 A1    Sep. 16, 2021

(30) Foreign Application Priority Data

Jan. 3, 2017  (KR) .................. 10-2017-0000753

(51) Int. Cl.
*C08J 3/12* (2006.01)
*B29C 33/42* (2006.01)
*B29C 39/26* (2006.01)

(52) U.S. Cl.
CPC .............. *B29C 39/26* (2013.01); *B29C 33/42* (2013.01); *C08J 3/12* (2013.01); *C08J 2351/08* (2013.01)

(58) Field of Classification Search
CPC ...... B29C 39/26; B29C 33/42; C08J 2351/08; C08J 3/12; B29B 9/10; B29B 9/12; B01J 2/02
See application file for complete search history.

(56) References Cited

U.S. PATENT DOCUMENTS

| 2002/0086104 A1 | 7/2002 | Yabuta et al. |
| 2003/0125479 A1 | 7/2003 | Kinsho et al. |
| 2004/0106223 A1 | 6/2004 | Kaneko et al. |

(Continued)

FOREIGN PATENT DOCUMENTS

| CN | 104059430 A | 9/2014 |
| CN | 105524207 A | 4/2016 |

(Continued)

OTHER PUBLICATIONS

Reinhold Schwalm, "UV Coatings Basics Recent Developments and New Applications" (Elsevier 2006), p. 115.

(Continued)

*Primary Examiner* — Jerzi H Moreno Hernandez
(74) *Attorney, Agent, or Firm* — Dentons US LLP

(57) ABSTRACT

The present invention relates to a method for preparing spherical cured polymer particles from a curable composition. The method comprises the steps of: dropping a curable composition onto a substrate having a water contact angle of 150° to 170° at 25° C. to form droplets of the curable composition; and curing the droplets to form the polymer particles.

8 Claims, 3 Drawing Sheets

(56) References Cited

U.S. PATENT DOCUMENTS

| | | | |
|---|---|---|---|
| 2011/0182805 A1 | 7/2011 | Desimone et al. | |
| 2012/0121858 A1* | 5/2012 | Kato | C09D 5/1681 |
| | | | 428/141 |
| 2013/0147074 A1* | 6/2013 | Hielscher | B29B 9/10 |
| | | | 264/13 |
| 2014/0194565 A1 | 7/2014 | Harada | |
| 2014/0329024 A1* | 11/2014 | Leem | C08F 2/10 |
| | | | 427/512 |
| 2015/0087742 A1 | 3/2015 | Won et al. | |
| 2016/0121286 A1* | 5/2016 | Sodd | B01J 2/26 |
| | | | 264/4.1 |
| 2016/0303049 A1 | 10/2016 | Desimone et al. | |
| 2016/0368169 A1* | 12/2016 | Huddleston | C11D 3/505 |
| 2017/0296999 A1 | 10/2017 | Choi et al. | |

FOREIGN PATENT DOCUMENTS

| | | |
|---|---|---|
| JP | 08311369 A | 11/1996 |
| JP | 09-24970 A | 9/1997 |
| JP | 2001106959 A | 4/2001 |
| JP | 2002284881 A | 10/2002 |
| JP | 2005112945 A | 4/2005 |
| JP | 2008-546715 A | 12/2008 |
| JP | 2010201560 A | 9/2010 |
| JP | 2010204386 A | 9/2010 |
| JP | 2012-77147 A | 4/2012 |
| JP | 2012077147 A * | 4/2012 |
| JP | 2016-540093 A | 12/2016 |
| KR | 1020040027369 A | 4/2004 |
| KR | 1020120039284 A | 4/2012 |
| KR | 1020120088345 A | 8/2012 |
| KR | 10-2013-0117399 A | 10/2013 |
| KR | 1020140063592 A | 5/2014 |
| KR | 1020140069499 A | 6/2014 |
| WO | 2007/149617 A1 | 12/2007 |
| WO | 2009/128591 A1 | 10/2009 |
| WO | 2010/137542 A1 | 12/2010 |
| WO | 2016/151629 A1 | 9/2016 |

OTHER PUBLICATIONS

George Odian, "Principle of Polymerization 2nd Ed." (Wiley 1981), p. 203.

* cited by examiner

[FIG. 1]
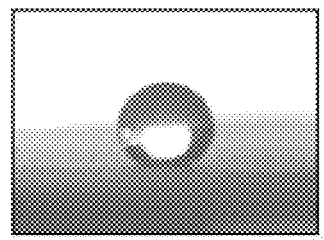
158°
[FIG. 2]
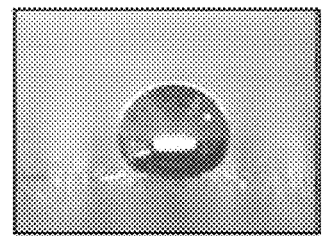
164°
[FIG. 3]
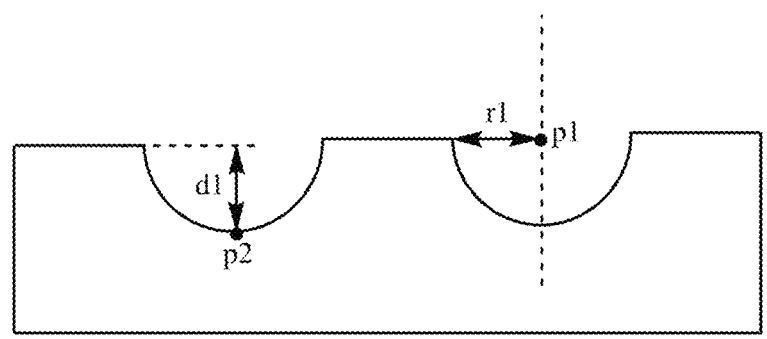

[FIG. 4]
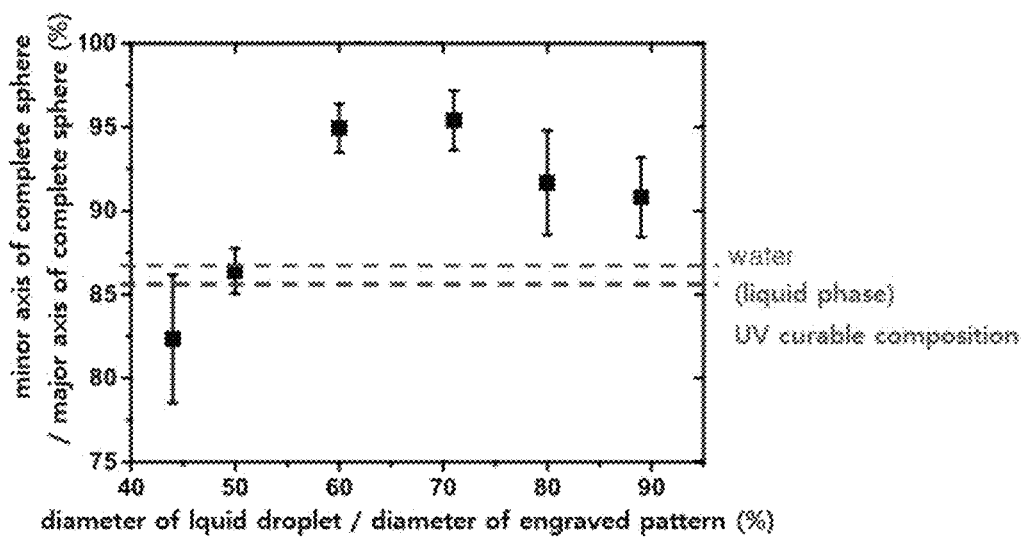

[FIG. 5]
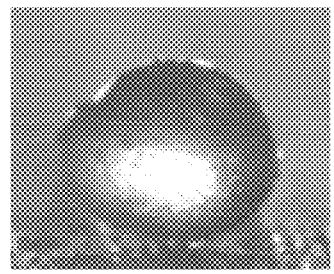
[FIG. 6]
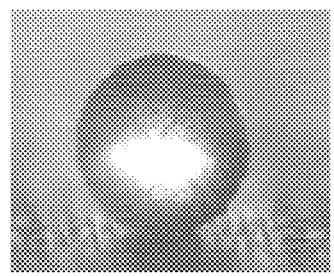
[FIG. 7]
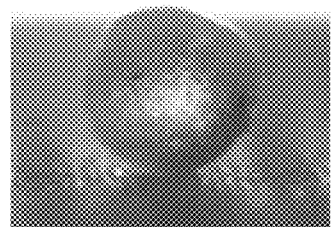

METHOD FOR PREPARING POLYMER PARTICLES

CROSS-REFERENCE TO RELATED APPLICATION(S)

This application is the U.S. national stage of international Application No. PCT/KR2017/014151 filed on Dec. 5, 2017, which claims the benefit of Korean Patent Application No. 10-2017-0000753 filed on Jan. 3, 2017 with the Korean Intellectual Property Office, the disclosures of which are herein incorporated by reference in their entirety.

TECHNICAL FIELD

The present invention relates to a method for preparing spherical polymer particles.

BACKGROUND

In general, a curable composition was coated on a flat substrate, and then, cured and provided as a cured product in the form of a sheet. However, such as sheet-shaped cured product is limited in terms of its applications, due to the shape. Particularly, in case a cured product is made in contact with other materials to induce a reaction, the sheet-shaped cured product is unfavorable because of the narrow surface area. Thus, there is a demand for the development of technology for providing a curable composition as cured products of other shapes instead of a sheet shape.

Meanwhile, a spherical shape is advantageous in that it can reduce a volume but increase a surface area compared to other shapes such as polygons, etc. Particularly, in case the particle size distribution of spherical particles is uniform, it has a wide specific surface area compared to an amorphous shape, and is easy to handle, thus increasing reaction efficiency. However, a method of preparing a spherical cured product with uniform particle size distribution has not been known yet.

Technical Problem

The present invention provides a method for preparing spherical polymer particles.

Technical Solution

Hereinafter, a method for preparing spherical polymer particles according to specific embodiments will be explained.

According to one embodiment of the invention, a method for preparing polymer particles is provided, which method comprises the steps of: dropping a curable composition on a substrate having a water contact angle of 150° to 170° at 25° C., on which semi-spherical engraved patterns are formed, to form droplets; and curing the droplets.

Throughout the specification, the term [contact angle] means an angle made by liquid, among the angles formed by tangent lines at the contact points of solid, liquid and gas phases and a solid surface, when the liquid is on the flat solid surface in the air. Unless specifically limited, a contact angle to a specific liquid may mean an angle made by the liquid, among the angles formed by tangent lines at the points where the liquid and the air are in contact and a substrate, when 5 $\mu\ell$ of the specific liquid is dropped on the flat surface of a specific substrate. Such a contact angle is measured at about 25° C. using a measuring device (model name: DSA100, manufacturing company: KRUSS GmbH).

According to the preparation method of one embodiment, by dropping a curable composition on a substrate that has a surface property wherein droplets having a large contact angle may be formed even if various kinds of curable compositions are dropped, and has semi-spherical engraved patterns formed thereon, and curing the same, polymer particles of almost complete spheres can be provided.

The contact angle is influenced by the surface energy of a substrate and the surface tension of a droplet. Although the surface tension of a droplet should be large so as to form a droplet having a large contact angle, most curable compositions have smaller surface tensions than that of water. Thus, according to the preparation method of one embodiment, as a substrate, a substrate that simultaneously exhibits hydrophobicity and oleophobicity, and has sufficiently low surface energy is used.

As the result of the experiments, the present inventors confirmed that if a substrate having a water contact angle of 150° to 170° at 25° C. is used, droplets having large contact angles can be formed from various kinds of curable compositions, and completed the present invention.

Specifically, in the preparation method, a substrate wherein a contact angle to a curable composition for providing the aimed polymer particles is 125° to 170°, 130° to 170°, 140° to 170°, 150° to 170° or 160° to 170°, may be used. Within such ranges, polymer particles of almost complete spheres can be provided.

Meanwhile, since most curable compositions have small surface tensions as explained above, even if a droplet having a large contact angle is formed, the droplet has a hanging down shape rather than a complete sphere. For example, referring to FIG. 1 and FIG. 2, it is confirmed that water having a contact angle of 158° is closer to a more complete sphere, compared to a curable composition having a contact angle of 164°. Thus, even if a curable composition is dropped to form droplets having a large contact angle, if the droplets of hanging down shape are cured, elliptical polymer particles may be provided.

And, droplets having large contact angles may be combined with neighboring droplets due to sliding, thus rendering it difficult to prepare spherical polymer particles.

Thus, the present inventors compensated for the shape of a droplet by forming semi-spherical engraved patterns on a substrate and dropping a curable composition on the semi-spherical engraved patterns, and solved the problem of sliding of spherical droplets and combining with the neighboring droplets. Particularly, it was found that polymer particles of almost complete spheres can be provided, by controlling a rate of the diameter of the semi-spherical engraved pattern and the diameter of the droplet, in the step of forming droplets.

Specifically, if a curable composition is dropped on the semi-spherical engraved patterns of the substrate such that the rate (D1/D2*100) of the diameter (D1) of the semi-spherical engraved pattern to the diameter (D2) of the droplet may become 50% to 90%, droplets of almost complete spheres can be formed. Particularly, if a curable composition is dropped on the semi-spherical engraved patterns of the substrate such that the rate (D1/D2*100) of the diameter (D1) of the semi-spherical engraved pattern to the diameter (D2) of the droplet may become 55% to 90%, 60% to 90%, 60% to 80%, 60% to 75%, or 65% to 75%, droplets closer to complete spheres can be formed.

The diameter (D2) of the droplet may be defined as the length of a major axis, measured by a contact angle measuring device at about 25° C. for a droplet formed by dropping a curable composition on the flat surface of a substrate. Since the diameter (D2) of the droplet is determined according to the amount of a curable composition dropped, the drop amount of a curable composition may be appropriately controlled according to the diameter of the semi-spherical engraved pattern formed on the substrate, thus forming droplets of almost complete spheres.

The shape of the engraved pattern formed on the substrate is not limited to a complete semi-spherical shape. In order to exhibit the rate of the diameter of a semi-spherical engraved pattern to the diameter of a droplet in the above explained range, it is appropriate that the rate (d1/r1*100) of the depth (d1) of the semi-spherical engraved pattern to the radius (r1) of the semi-spherical engraved pattern is controlled to 30% to 100%. Referring to FIG. 3, the radius (r1) of the semi-spherical engraved pattern means a length from the middle point (p1) of a line segment (diameter) connecting the point where the engraved pattern begins and the point where it ends on the side of a substrate on which the semi-spherical engraved patterns are formed, by the shortest distance, to the point where the engraved pattern begins, and the depth (d1) means a length from the middle point (p1) to the lowest point (p2) of the engraved pattern.

In the preparation method, in order to provide spherical polymer particles using various kinds of curable compositions as possible, as a substrate, a substrate simultaneously exhibiting hydrophobicity and oleophobicity and having sufficiently low surface energy may be used.

As the substrate exhibiting such surface properties, a substrate wherein a coating layer capable of realizing a low surface energy is formed on a support base may be used.

And, in order to form semi-spherical engraved patterns on the substrate, semi-spherical engraved patterns may be formed on the support base, and then, a coating layer capable of realizing a low surface energy may be formed thereon.

Using this method, various materials can be adopted as the support base. As non-limiting examples, as the support base, a base formed of metal-based materials that are easy to process, such as aluminum, copper, Stainless Steel, or alloy, etc; a plastic base such as a polyethylene terephthalate film, etc.; fabric such as non-woven fabric or tissue, etc.; a nylon mesh; or a Stainless Steel mesh, etc. may be used.

And, semi-spherical engraved patterns are formed on the support base. For the formation the semi-spherical engraved patterns, various methods known in the art may be used. The diameter of the semi-spherical engraved pattern formed on the support base may be controlled according to the particle diameter of the polymer particle to be prepared. Specifically, the diameter of the semi-spherical engraved pattern may be controlled such that a rate (D1/D2*100) of the diameter (D1) of the semi-spherical engraved pattern to the diameter (D2) of the droplet may become 50% to 90%.

After forming the semi-spherical engraved patterns on the support base, a composition for the formation of a coating layer on the support base may be coated and dried and/or cured. Here, the components and composition of the composition for the formation of a coating layer may be appropriately controlled such that the coating layer may exhibit appropriate surface energy, considering the surface tension of the curable composition to be used.

Specifically, a composition comprising fluorine-containing polymer may be coated on the support base and dried and/or cured to form a substrate. If necessary, in order to improve the adhesion between the support base and the coating layer, or durability of the substrate, etc., a primer layer may be formed on the support base, and then, a coating layer may be formed.

Specifically, as the fluorine-containing polymer, polymer having a fluorinated hydrocarbon group and/or a perfluoroether group, etc. may be used. And, as the fluorine-containing polymer, polymer including silicon; silicon and oxygen; or silicon and nitrogen may be used, and polymer into which a reactive functional group such as a hydrolyzable functional group, etc. are introduced, may be used.

In addition to the fluorine-containing polymer, in the composition for the formation of a coating layer, other polymers that do not contain fluorine, for example, polysulfone, polyethersulfone, polyetherimide, polyamide, polyacrylonitriel, etc. may be included, and inorganic particles such as silica, etc. may be included.

Using such a composition, excellent adhesion may be exhibited to a flexible support base and even to the curved surface of a support base. And, due to the coating layer exhibiting hydrophobicity and oleophobicity, the polymer particles cured according the preparation method may be easily separated from the substrate. As the composition, NeverWet SE commercially available from NeverWet, LLC, etc. may be used.

The composition may be coated by a method known in the art, and as non-limiting examples, it may be coated by spray coating or dip coating.

Meanwhile, as the curable composition, a composition comprising various kinds of oligomers or monomers, an initiator, additives, a solvent may be used according to the polymer particles to be provided and the use purpose of the polymer particles. As the curable composition, photocurable, thermally curable or hybrid-curable composition may be used. Among them, a photocurable composition may be used in that it may be cured within a short time to enable continuous production at high speed, and it is environmentally-friendly because the amount of solvents discharged is small.

Meanwhile, as the curable composition, a curable composition that can provide absorbent polymer particles may be used.

The absorbent polymer particles is synthetic polymer material that can absorb moisture of 500 to 1000 times of self-weight, and it is being widely used as hygienic goods such as a disposable diaper and so on, water-holding material for soil, water stop material for civil engineering and architecture, sheets for raising seedling, freshness preservatives in the field of food circulation, fomentation material, etc.

The curable composition that can provide absorbent polymer particles may comprise water soluble ethylenically unsaturated monomers, a crosslinking agent and a polymerization initiator.

The water-soluble ethylenically unsaturated monomers may include one or more selected from the group consisting of anionic monomers and salts thereof such as (meth)acrylic acid, maleic acid, maleic anhydride, fumaric acid, crotonic acid, itaconic acid, sorbic acid, vinyl phosphinic acid, vinyl sulfonic acid, allyl sulfonic acid, 2-(meth)acryloylethane sulfonic acid, 2-(meth)acryloyloxy ethane sulfonic acid, 2-(meth)acryloyl propane sulfonic acid, or 2-(meth)acrylamido-2-methyl propane sulfonice acid; non-ionic hydrophilic group containing monomers such as (meth)acrylamide, N-substituted (meth)acrylate, 2-hydroxyethyl (meth) acrylate, 2-hydroxypropyl (meth)acrylate, methoxy polyethylene glycol (meth)acrylate, or polyethylene glycol (meth)acrylate; and amino group containing unsaturated monomers such as (N,N)-dimethylaminoethyl (meth)acrylate, (N,N)-dimethylaminopropyl (meth)acrylamide, and quarternarized products thereof.

The water soluble ethylenically unsaturated monomers may consist of monomers having acid groups of which at least a part are neutralized. Specifically, at least a part of the water soluble ethylenically unsaturated monomers may consist of salts of the anionic monomers. More specifically, as the water soluble ethylenically unsaturated monomers, acrylic acid or salts thereof may be used, and in case acrylic acid is used, at least a part thereof may be neutralized before use. For example, in case an alkali metal salt of acrylic acid is used as the water soluble ethylenically unsaturated monomers, the acrylic acid may be neutralized with a neutralization agent such as caustic soda (NaOH) and used. Here, the degree of neutralization of the acrylic acid may be controlled to about 50 to 95 mol %, or about 60 to 85 mol %, and within this range, absorbent polymer particles with excellent centrifuge retention capacity can be provided without a concern of precipitation during neutralization.

In the curable composition, the concentration of the water soluble ethylenically unsaturated monomers may be controlled to about 20 to about 60 wt %, based on the total curable composition comprising monomers, a crosslinking agent, a polymerization initiator, additives and a solvent, etc.

The crosslinking agent consists of compounds including two or more crosslinkable functional groups in the molecule so as to crosslink the water soluble ethylenically unsaturated monomers. The crosslinking agent may include a double bond between carbons as the crosslinkable functional group so as to progress smooth crosslinking polymerization of the above explained water soluble ethylenically unsaturated monomers. More specific examples of the crosslinking agent may include one or more selected from the group consisting of polyethyleneglycol diacrylate (PEGDA), glycerin diacrylate, clygerin triacrylate, non-modified or ethoxylated trimethylolpropane triacrylate (TMPTA), hexanediol diacrylate and triethylene glycol diacryate.

In the curable composition, the concentration of the crosslinking agent may be controlled to about 0.01 to about 2 wt %, based on the total curable composition.

The polymerization initiator may be appropriately selected according to polymerization methods, a thermal polymerization initiator may be used when a thermal polymerization method is used, and a photopolymerization initiator may be used when a photopolymerization method is used. However, even in the case of photopolymerization, since a certain amount of heat is generated by UV irradiation, etc., and heat is generated to some degree according to the progression of an exothermic polymerization reaction, a thermal polymerization initiator may be additionally included.

The photopolymerization initiator is not limited in terms of its construction, as long as it is a compound capable of forming a radical by light such as UV. As the photopolymerization initiator, one or more selected from the group consisting of benzoin ether, dialkyl acetophenone, hydroxyl alkylketone, phenyl glyoxylate, benzyl dimethyl Ketal, acyl phosphine, and α-aminoketone may be used. Specific example of the acyl phosphine may include diphenyl(2,4,6-trimethylbenzoyl)phosphine oxide, phenylbis(2,4,6-trimethylbenzoyl)phosphine oxide, ethyl (2,4,6-trimethylbenzoyl) phenylphosphinate, etc. More various photopolymerization initiators are described in Reinhold Schwalm, "UV Coatings: Basics, Recent Developments and New Application (Elsevier 2007)", page 115, and are not limited to the above described examples.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis (2-amidinopropane) dihydrochloride, 2,2-azobis-(N, N-dimethylene)isobutyramidine dihydrochloride, 2-(carbamoylazo)isobutylonitril, 2,2-azobis[2-(2-imidazolin-2-yl) propane] dihydrochloride, 4,4-azobis-(4-cyanovaleric acid), etc. More various thermal initiators are described in "Principle of Polymerization (Wiley, 1981)", Odian, page 203, and are not limited to the above described examples.

The concentration of the polymerization initiators in the curable composition may be controlled to about 0.0001 to about 1 wt %, based on the total curable composition.

The curable composition may further comprise additives such as a thickener, a plasticizer, a preservation stabilizer, an antioxidant, etc., as necessary.

The above explained raw materials such as water soluble ethylenically unsaturated monomers, a crosslinking agent, a polymerization initiator and additives may be prepared in the form of a solution dissolved in a solvent.

Here, the solvent that can be used is not limited in terms of its construction as long as it can dissolve or disperse the above explained components, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination. The solvent may be included in the remaining amount excluding the above-explained components, based on the total amount of the curable composition.

However, the curable composition is not limited to a composition for the preparation of absorbent polymer particles, and it may be one of various curable compositions known in the art.

In the step of forming droplets, a curable composition may be dropped on the semi-spherical engraved patterns of a substrate to form droplets. A method of dropping a curable composition is not specifically limited, and various methods known in the art may be used.

In the step of forming droplets, in order to provide polymer close to a complete sphere as explained above, the drop amount of the curable composition may be controlled such that a rate (D1/D2*100) of the diameter (D1) of the semi-spherical engraved pattern to the diameter (D2) of the droplet may be within the above explained range.

Thereafter, in the step of curing droplets, the droplets may be cured under appropriate conditions according to the cure type of the curable composition, thus providing polymer particles. The curing method is not specifically limited, and it may be conducted according to various methods known in the art.

Using the preparation method of one embodiment, without a need to adopt a separate process after the crosslinking polymerization of a curable composition, the shape of a curable composition may be controlled while curing the curable composition. Particularly, using the preparation method of one embodiment, polymer particles close to a complete sphere can be provided. Specifically, the polymer particles prepared by the above preparation method may have a rate of the minor axis to the major axis passing through the center, of 80% to 100%, 85% to 100%, 90% to 100%, 91% to 100%, 92% to 100% or 93% to 100%. Theoretically, in a complete sphere, the lengths of the major axis and the minor axis passing through the center are identical, and thus, a rate of the minor axis to the major axis becomes 100%. Thus, it is understood that as a rate of the minor axis to the major axis is closer to 100%, the polymer particle has a shape closer to a complete sphere.

Advantageous Effects

According to one embodiment of the invention, cured polymer particles having a spherical shape can be provided from a curable composition.

BRIEF DESCRIPTION OF THE DRAWINGS

FIG. 1 is an image showing the shape of a droplet formed of water having a contact angle of 158°.

FIG. 2 is an image showing the shape of a droplet formed of a curable composition having a contact angle of 164°.

FIG. 3 is a drawing schematically showing the cross section of a substrate, for the explanation of the radius and depth of the semi-spherical engraved pattern formed on the substrate.

FIG. 4 is a graph showing the rate (y axis) of the minor axis to the major axis of the polymer particles, according to the rate (x axis) of the diameter of the semi-spherical engraved pattern to the diameter of the droplet, in the polymer particle prepared in Examples 1 to 6.

FIGS. 5 to 7 are images showing the shapes of the polymer particles prepared in Examples 1, Example 4 and Example 6, respectively.

DETAILED DESCRIPTION OF THE EMBODIMENTS

Hereinafter, preferable examples are presented for better understanding of the present invention. However, these examples are presented only as the illustrations of the present invention, and the present invention is not limited thereby.

Example 1: Preparation of Polymer Particles

Semi-spherical engraved patterns were formed using an Al substrate as a support base, and using NeverWet SE available from NeverWet, LLC, a primer layer and a top coating layer were formed on the support base. After coating, the diameter of the semi-spherical engraved pattern of the substrate was 1500 μm.

Meanwhile, to 500 g of acrylic acid, 1.5 g of polyethylene glycol diacrylate (PEGDA, molecular weight 400), 0.5 g of trimethylolpropane triacrylate including 9 mol % of ethylene oxide (Ethoxylated-TMPTA, TMP (EO)9TA, M-3190, Miwon Specialty Chemicals Co., Ltd.), and 0.4 g of IRGA-CURE 819 were added, and 800 g of a 24 wt % caustic soda solution was gradually added dropwise. The mixed solution heated by the neutralization heat was cooled to prepare a curable composition.

And, the diameter according to the volume of the curable composition was obtained as follows Specifically, each 10 μℓ, 8 μℓ, 7 μℓ, 4 μℓ and 2 μℓ of the curable composition was dropped on the flat surface of the substrate to form 5 droplets. And, with a contact angle measuring device (model name: DSA100, Manufacturing Company: KRUSS GmbH), for the 5 droplets, the lengths of the major axis were measured at about 25° C., which were determined as the diameters according to the volume of the curable composition. As the result of measurement, the diameter for 10 μℓ was 3400 μm, the diameter for 8 μℓ was 3000 μm, the diameter for 7 μℓ was 2800 μm, the diameter for 4 μℓ was 2500 μm, and the diameter for 2 μℓ was 2250 μm.

On each semi-spherical engraved pattern of the substrate, each 10 μℓ of the curable composition was dropped to form spherical droplets.

From the measurement result of the diameter according to the volume of the curable composition, a rate (D1/D2*100) of the diameter (D1, 1500 μm) of the semi-spherical engraved pattern to the diameter (D2, 3400 μm) of the droplet was calculated to be about 44%.

Thereafter, the droplets were cured by UV irradiation, thus preparing polymer particles.

Example 2: Preparation of Polymer Particles

Polymer particles were prepared by the same method as Example 1, except that 8 μℓ of the curable composition was dropped on each semi-spherical engraved pattern of the substrate.

From the measurement result of the diameter according to the volume of the curable composition of Example 1, a rate (D1/D2*100) of the diameter (D1, 1500 μm) of the semi-spherical engraved pattern to the diameter (D2, 3000 μm) of the droplet was calculated to be about 50%.

Example 3: Preparation of Polymer Particles

Polymer particles were prepared by the same method as Example 1, except that 4 μℓ of the curable composition was dropped on each semi-spherical engraved pattern of the substrate.

From the measurement result of the diameter according to the volume of the curable composition of Example 1, a rate (D1/D2*100) of the diameter (D1, 1500 μm) of the semi-spherical engraved pattern to the diameter (D2, 2500 μm) of the droplet was calculated to be about 60%.

Example 4: Preparation of Polymer Particles

A substrate on which semi-spherical engraved patterns are formed was manufactured by the same method as Example 1, except that the diameter of the semi-spherical engraved pattern was 2000 μm.

Each 7 μℓ of the curable composition identical to that of Example 1 was dropped on each semi-spherical engraved pattern of the substrate, to form spherical droplets.

From the measurement result of the diameter according to the volume of the curable composition of Example 1, a rate (D1/D2*100) of the diameter (D1, 2000 μm) of the semi-spherical engraved pattern to the diameter (D2, 2800 μm) of the droplet was calculated to be about 71%.

Thereafter, the droplets were cured by the same method as Example 1, thus preparing polymer particles.

Example 5: Preparation of Polymer Particles

Polymer particles were prepared by the same method as Example 4, except that each 4 μℓ of the curable composition was dropped on each semi-spherical engraved pattern of the substrate.

From the measurement result of the diameter according to the volume of the curable composition of Example 1, a rate (D1/D2*100) of the diameter (D1, 2000 μm) of the semi-spherical engraved pattern to the diameter (D2, 2500 μm) of the droplet was calculated to be about 80%.

Example 6: Preparation of Polymer Particles

Polymer particles were prepared by the same method as Example 4, except that each 2 μℓ of the curable composition was dropped on each semi-spherical engraved pattern of the substrate.

From the measurement result of the diameter according to the volume of the curable composition of Example 1, a rate (D1/D2*100) of the diameter (D1, 2000 μm) of the semi-spherical engraved pattern to the diameter (D2, 2250 μm) of the droplet was calculated to be about 89%.

Experimental Example: Confirmation of the Sphericity of Polymer Particles

For the polymer particles prepared in Examples, a rate of the minor axis to the major axis passing through the center was measured, and the results were shown in the following Table 1 and FIG. 4. Theoretically, a complete sphere has identical lengths of the major axis and the minor axis passing through the center, and thus, as a rate of the minor axis to the major axis is closer to 100%, it means that the polymer particle has a shape closer to a complete sphere.

TABLE 1

|  | Example 1 | Example 2 | Example 3 | Example 4 | Example 5 | Example 6 |
| --- | --- | --- | --- | --- | --- | --- |
| D1/D2*100 | 44% | 50% | 60% | 71% | 80% | 89% |
| rate of the minor axis to the major axis | 82% | 86% | 95% | 95% | 92% | 91% |

And, the shapes of the polymer particles prepared in Example 1, Example 4 and Example 6 were observed using a contact angle measuring device (model name: DSA100, Manufacturing Company: KRUSS GmbH).

Referring to the Table 1 and FIGS. 4 to 7, it is confirmed that according to the preparation method of one embodiment of the present invention, spherical polymer particles can be provided, and particularly, it is confirmed that in case a rate (D1/D2*100) of the diameter (D1) of a semi-spherical engraved pattern to the diameter (D2) of a droplet is 50% to 90%, polymer particles close to a complete sphere can be provided.

The invention claimed is:

1. A method for preparing polymer particles comprising the steps of:
    dropping a curable composition onto a substrate having a water contact angle of 150° to 170° at 25° C. to form a plurality of droplets of the curable composition; and
    curing the plurality of droplets to form the polymer particles,
    wherein the substrate comprises a plurality of semi-spherical engraved patterns,
    wherein the curable composition is dropped onto the semi-spherical engraved patterns of the substrate such that a ratio percentage (D1/D2*100) of a diameter (D1) of each of the plurality of semi-spherical engraved patterns to a diameter (D2) of each of the plurality of droplets is from 60% to 80%,
    wherein the polymer particles have a substantially spherical shape, and
    wherein a minor axis passing through a center of each of the polymer particles is 92% to 100% of a major axis passing through the center of each of the polymer particles.

2. The method for preparing polymer particles according to claim 1, wherein the substrate has a contact angle of 125° to 170° with respect to the curable composition.

3. The method for preparing polymer particles according to claim 1, wherein a ratio percentage (d1/r1*100) of a depth (d1) of each of the plurality of semi-spherical engraved patterns to a radius (r1) of each of the plurality of semi-spherical engraved patterns of the substrate is from 30% to 100%.

4. The method for preparing polymer particles according to claim 1, wherein the curable composition comprises water soluble ethylenically unsaturated monomers, a crosslinking agent and a polymerization initiator.

5. The method for preparing polymer particles according to claim 1, wherein the diameter (D1) of each of the plurality of semi-spherical engraved patterns is from 1500 μm to 2000 μm.

6. The method for preparing polymer particles according to claim 1, wherein the diameter (D2) of each of the droplets is from 2250 μm to 3400 μm.

7. The method for preparing polymer particles according to claim 4, wherein a concentration of the water soluble ethylenically unsaturated monomers is 20 wt. % to 60 wt. % of a total weight of the curable composition.

8. The method for preparing polymer particles according to claim 4, wherein the curable composition further comprises at least one additive selected from the group consisting of a thickener, a plasticizer, a preservation stabilizer and an antioxidant.

* * * * *